United States Patent
Mansell

(10) Patent No.: US 9,722,403 B2
(45) Date of Patent: Aug. 1, 2017

(54) ELECTRICAL RACEWAY DRAIN FITTING

(71) Applicant: Denny Mansell, Katy, TX (US)

(72) Inventor: Denny Mansell, Katy, TX (US)

( * ) Notice: Subject to any disclaimer, the term of this patent is extended or adjusted under 35 U.S.C. 154(b) by 139 days.

(21) Appl. No.: 13/656,547

(22) Filed: Oct. 19, 2012

(65) Prior Publication Data

US 2014/0110008 A1 Apr. 24, 2014

(51) Int. Cl.
*H02G 3/06* (2006.01)
*H02G 1/08* (2006.01)
*F16L 23/16* (2006.01)
*H02G 3/04* (2006.01)

(52) U.S. Cl.
CPC ............. *H02G 3/06* (2013.01); *F16L 23/167* (2013.01); *H02G 1/08* (2013.01); *F16L 2201/30* (2013.01); *H02G 3/0481* (2013.01)

(58) Field of Classification Search
CPC .......... H02G 3/06; H02G 3/0481; H02G 1/08; F16L 23/167; F16L 2201/30
USPC ............... 285/14, 13, 39, 18, 42, 90, 136.1; 138/109
See application file for complete search history.

(56) References Cited

U.S. PATENT DOCUMENTS

| | | | | |
|---|---|---|---|---|
| 1,985,012 | A | * 12/1934 | Boehm | F16L 27/093 285/14 |
| 4,171,209 | A | * 10/1979 | Brown | 55/466 |
| 4,424,989 | A | * 1/1984 | Spencer et al. | 285/14 |
| 5,796,035 | A | * 8/1998 | Walker | 174/659 |
| 2008/0185836 | A1 | * 8/2008 | Bly | 285/18 |

* cited by examiner

*Primary Examiner* — Gregory Binda
*Assistant Examiner* — Zachary Dragicevich
(74) *Attorney, Agent, or Firm* — Daniel N. Lundeen; Lundeen & Lundeen PLLC

(57) ABSTRACT

A low point raceway fitting for draining accumulated condensation from electrical raceway systems installed in industrial, commercial and residential facilities. The drain fitting is a tubular member having a throughbore for pulling wire, connecting ends for installation in a raceway system, and an enlarged section between the ends profiled for engagement by a tool for installation. A drain passage is formed radially through the tool engaging section and is positioned at the underside of the horizontal fitting for gravity drainage. A screen insert can be placed in the drain passage to keep dirt and insects out.

21 Claims, 9 Drawing Sheets

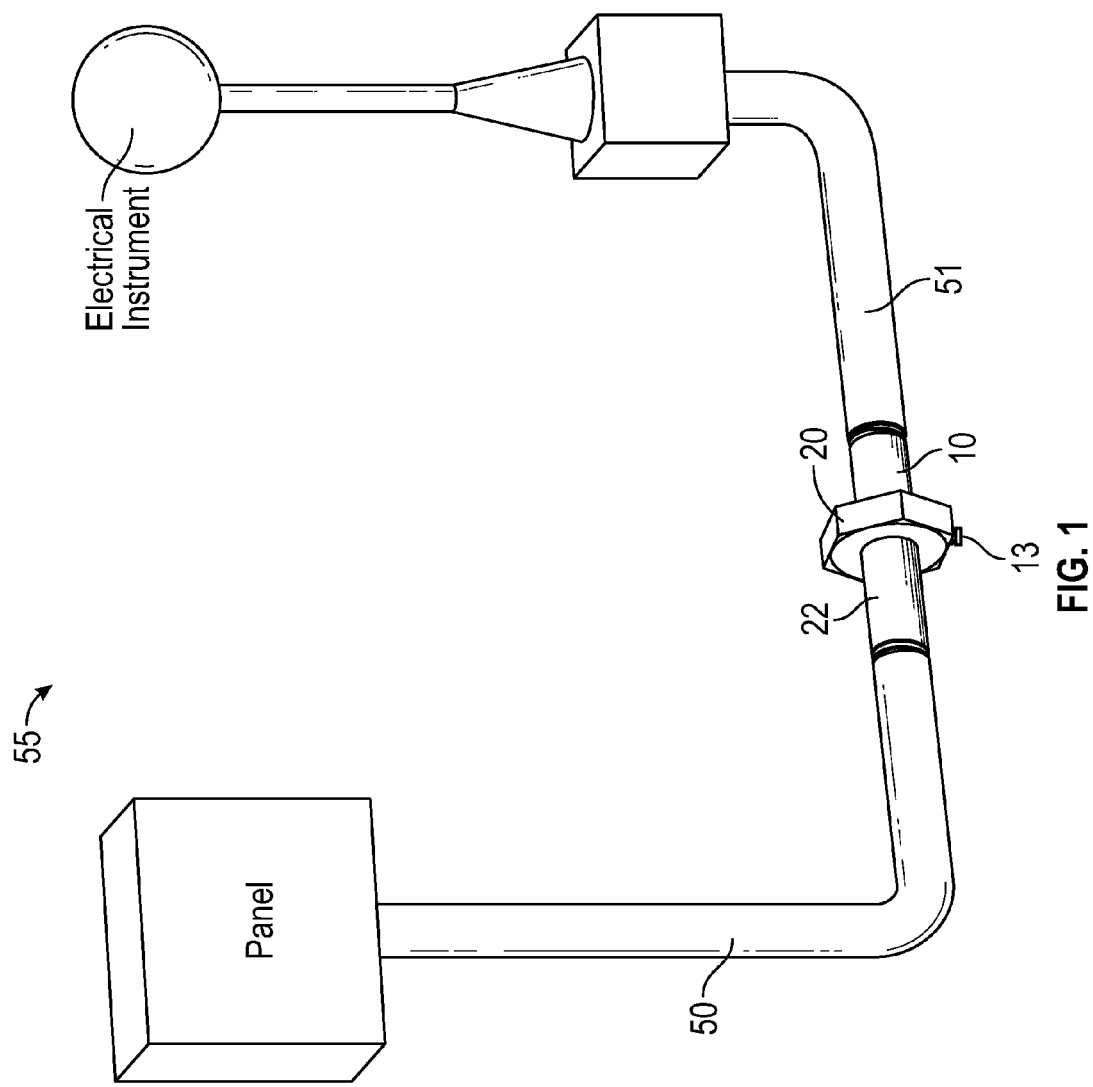

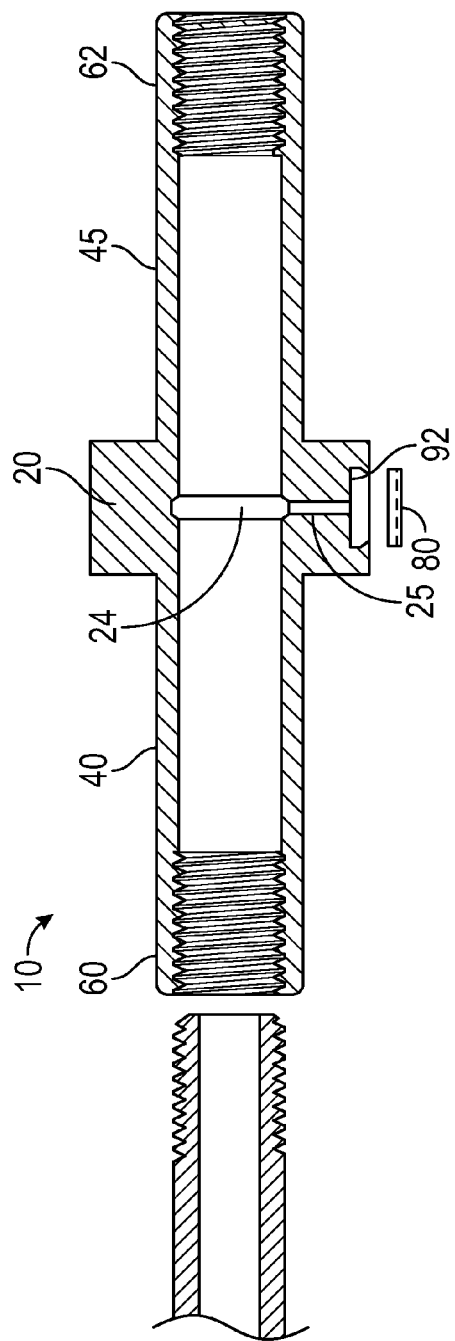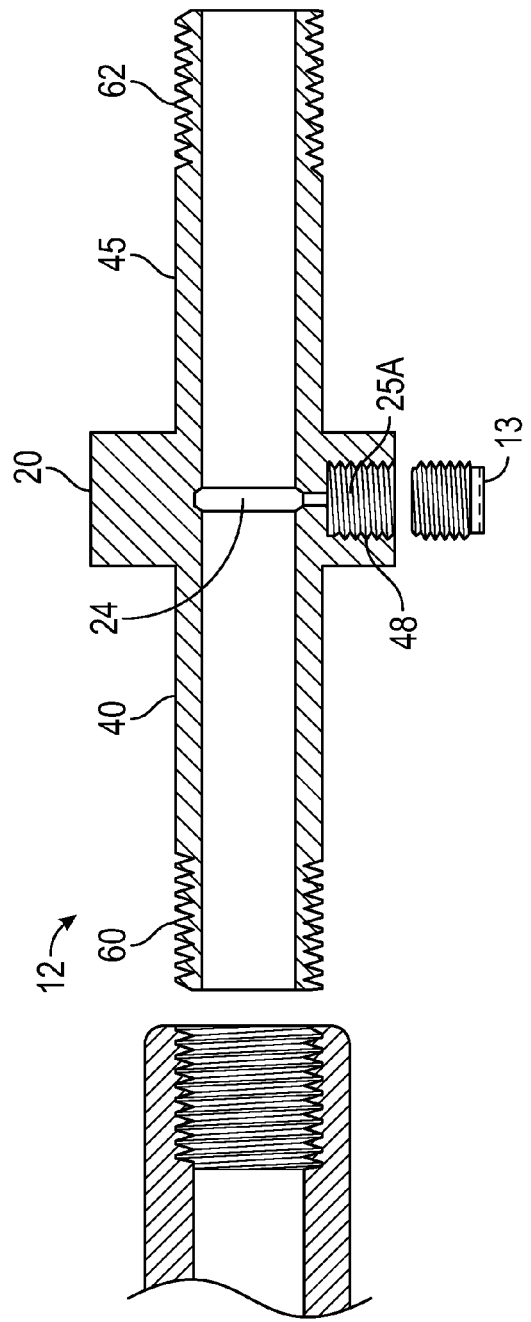

ELECTRICAL RACEWAY DRAIN FITTING

FIELD OF THE INVENTION

The present invention relates generally to electrical raceways, including tubes and conduits, and more particularly to a device to support electrical drain systems for removing condensation from electrical raceway systems at low point areas.

In commercial, offshore, and industrial construction, it is common practice to contain electrical wiring in metal, or sometimes plastic, raceways. Even in relatively dry locations, moisture typically forms on the interior walls of the raceway due to condensation of various types of vapor in the air. In installations where raceways are employed, corrosion and premature deterioration of the raceway material may result. Further, because they carry live electrical wires, an accumulation of moisture vapor in the raceway system may result in creating an electrical short circuit and damage to electrical devices or ignition of flammable vapors.

The problem of condensate accumulating inside the raceways may be eliminated by providing a drain at various low points in the raceway system. Currently the fittings used are heavy, bulky, expensive, and difficult and labor-intensive to install. Additionally, the current fittings used add extra weight to offshore structures and require more space to install. The current installation of fittings known to those skilled in the art would require multiple cutting and threading of multiple raceway sections with an increased risk of improper installation. What is needed is a simple device that can be easily installed within an electrical raceway system that decreases the risk of compromising the integrity of the electrical raceway.

SUMMARY OF THE INVENTION

The present invention provides a low-point drain fitting for removing accumulated condensation from electrical raceway systems. The drain fitting includes a tubular member having a throughbore with internally or externally disposed connection portions on opposing ends. Centrally incorporated upon the external surface of the tubular member is a tool engaging member protruding outwardly, whereby the drain fitting can be easily installed. An aperture or drain passage is located through the tool engaging member extending transversely to the throughbore, and can be positioned underneath the throughbore when installed in a raceway system. In embodiments, a screen insert can be installed in the drain passage.

One object of the invention is to provide a drain fitting that is easily installed within the electrical raceway system. Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1 is an isometric schematic of one embodiment of a drain fitting installed within an electrical raceway system.

FIG. 8 is a side sectional view of an embodiment of the fitting with internal threads on the tubular member for connection to a raceway fitting and with the screen insert of FIG. 2.

FIG. 8A is a side sectional view of an embodiment of the fitting with external threads for connection to a raceway section and with the screen insert of FIG. 2A.

DETAILED DESCRIPTION

Figure 1A:
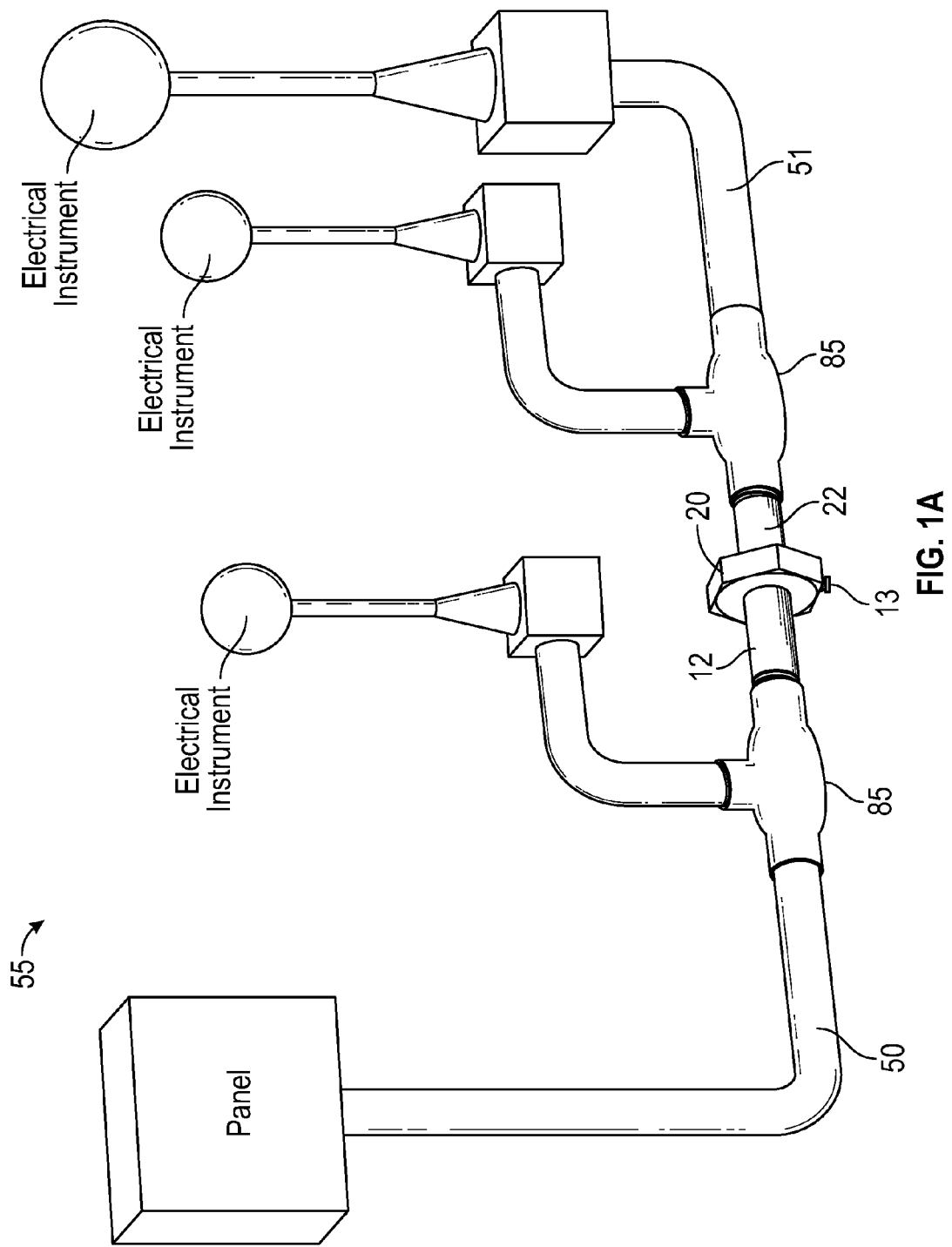
FIG. 1A is an isometric schematic of an alternative embodiment of a drain fitting installed within an electrical raceway system.

With reference to FIG. 1 there is shown an isometric view of an embodiment of the present invention, drain coupling (10) with internal connections installed in an electrical raceway system (55) at a low point to allow gravity drainage of water accumulated as a result of moisture condensation within the electrical raceway system. Drain coupling (10) is situated between interconnected raceway section (50) and raceway section (51) as shown in FIG. 1. Alternatively drain nipple (12) with external threads can be installed between conventional junction tee fittings (85) as shown in FIG. 1A.

Figure 2:
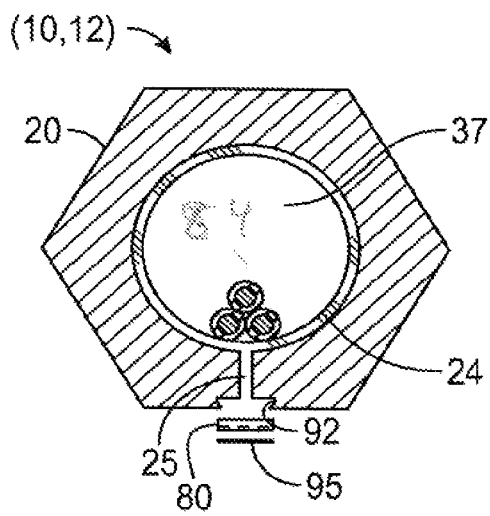
FIG. 2 is a cross-sectional view of the fitting through the tool engaging member with an embodiment of a screen insert placed within a drain passage perpendicular to the throughbore.
Figure 2A:
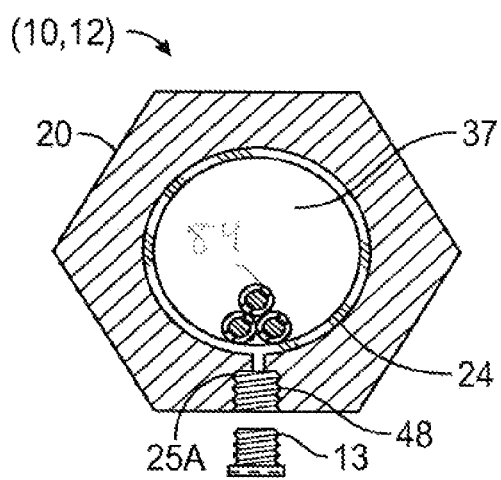
FIG. 2A is a cross-sectional view of the fitting through the tool engaging member with an embodiment of a threaded screen insert placed within the drain passage.
Figure 6:
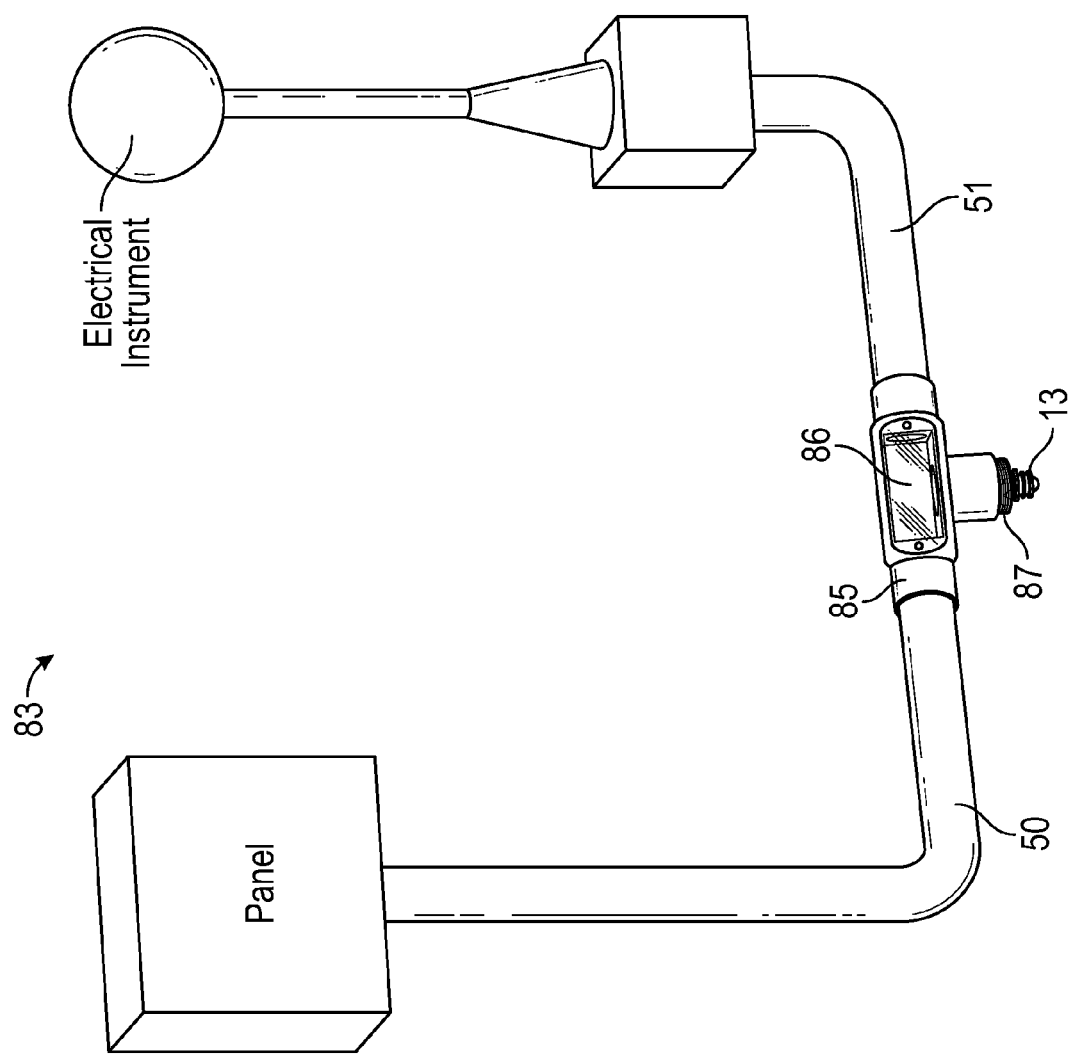
FIG. 6 is an isometric schematic of prior art drain fittings installed within an electrical raceway system.

In use, to install the drain coupling (10) or nipple (12) as shown in FIGS. 1 and 1A respectively, at the interconnections of raceway sections (50) and (51) and/or tee fittings (85), a tool is used to rotate the fitting (10, 12) using the tool engaging member (20) to thread or otherwise connect the connecting ends (22) to adjacent raceway section(s) (50,51) and/or tee fitting(s) (85), and the screen insert (13) is installed in the drain passage (25A) (see FIG. 2A). Thus, a technician would not have to cut and thread, which is done currently to install the tee (85) and drain insert (13) in the prior art raceway system (83) as shown in FIG. 6. Thus, time is saved during the installation phase. Additionally, by installing the device (10, 12) of the present invention without cutting and threading, factory coatings are preserved on metal raceways, thereby preventing premature corrosion and eliminating field dressing within an electrical raceway system.

The drain coupling (10) or nipple (12) in FIGS. 1 and 1A, respectively, replace the juncture configuration using raceway tee fitting (85) depicted in the prior art connecting horizontal sections (50) and (51) shown in FIG. 6. The device (10, 12) of the present invention decreases the installation time relative to that required to install the standard raceway tee fitting (85) illustrated in FIG. 6, which includes a tee cover (86), gasket (not shown), reducer (87) and screen insert (13). Additionally, the time normally required to pull wire (84) (see FIGS. 2, 2A, 3) through the tee fitting (85) is significantly decreased by installation of drain coupling (10) or nipple (12), saving time and money in equipment and labor. Another advantage is that the drain coupling (10) or nipple (12) is a unitary piece that is lighter in weight and requires less space, which can be important for installation on an offshore platform. This means that the drain device has a monolithic body that can receive screens or other drain inserts as shown in FIGS. 1-5A and 7-8A. An electrical raceway such as tubing or conduit inherently means an enclosed tubing, conduit or other raceway that forms a physical pathway for electrical wiring, thereby protecting wires and cables within the raceway from heat, humidity, corrosion, water intrusion and general physical threats.

With reference to FIGS. 2, 2A, 3, and 3A, there are shown cross sectional views and a side sectional view through the tool engaging member (20) intersecting the drain passage (25, 25A, 35) of alternative embodiments of the present invention. Drain coupling (10) or nipple (12) further comprise a cylindrical tubular member (22) of a pre-determined length (see FIGS. 3A-5A, 7-8A) with a throughbore (37) having a generally continuous diameter therethrough to receive raceway wires (84), and a radial groove or cavity (24) formed inside at the drain passage (25, 25A, 35). Coupling (10) or nipple (12) can be made of galvanized steel, PVC piping, PVC coated steel, stainless steel, brass, or another suitable type of material that will not rust from moisture or corrosive environments.

Referring to FIGS. 4, 4A, 5, and 5A, in the preferred embodiment, the tubular member (22) can have a length and diameter configured to accommodate any raceway size. The specific length of the tubular member (22) depends on the diameter of the tubular member (22) as required for the electrical raceway system (55), raceway sections (50, 51) and/or the connecting fittings (85). In the preferred embodiment, the diameter of the tubular member (22) can be nominally at least ½ inch. Additionally, the length of the opposing connection members (60, 62) depends on the diameter and the length of tubular member (22). Thus, drain coupling (10) or nipple (12) of the present invention can be configured and manufactured to fit any electrical raceway.

Figure 3:
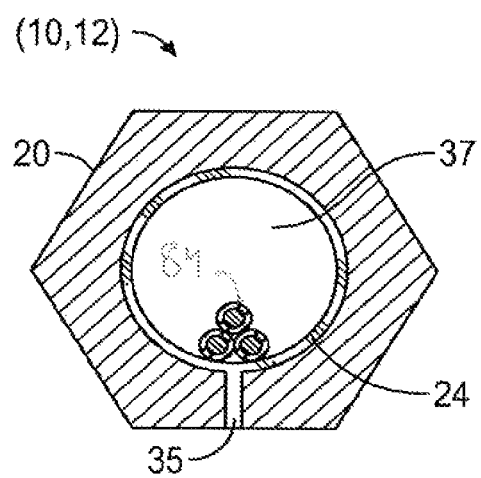
FIG. 3 is a cross-sectional view of the fitting through the tool engaging member with an embodiment of the drain passage formed as a bore perpendicular to the throughbore.
Figure 3A:
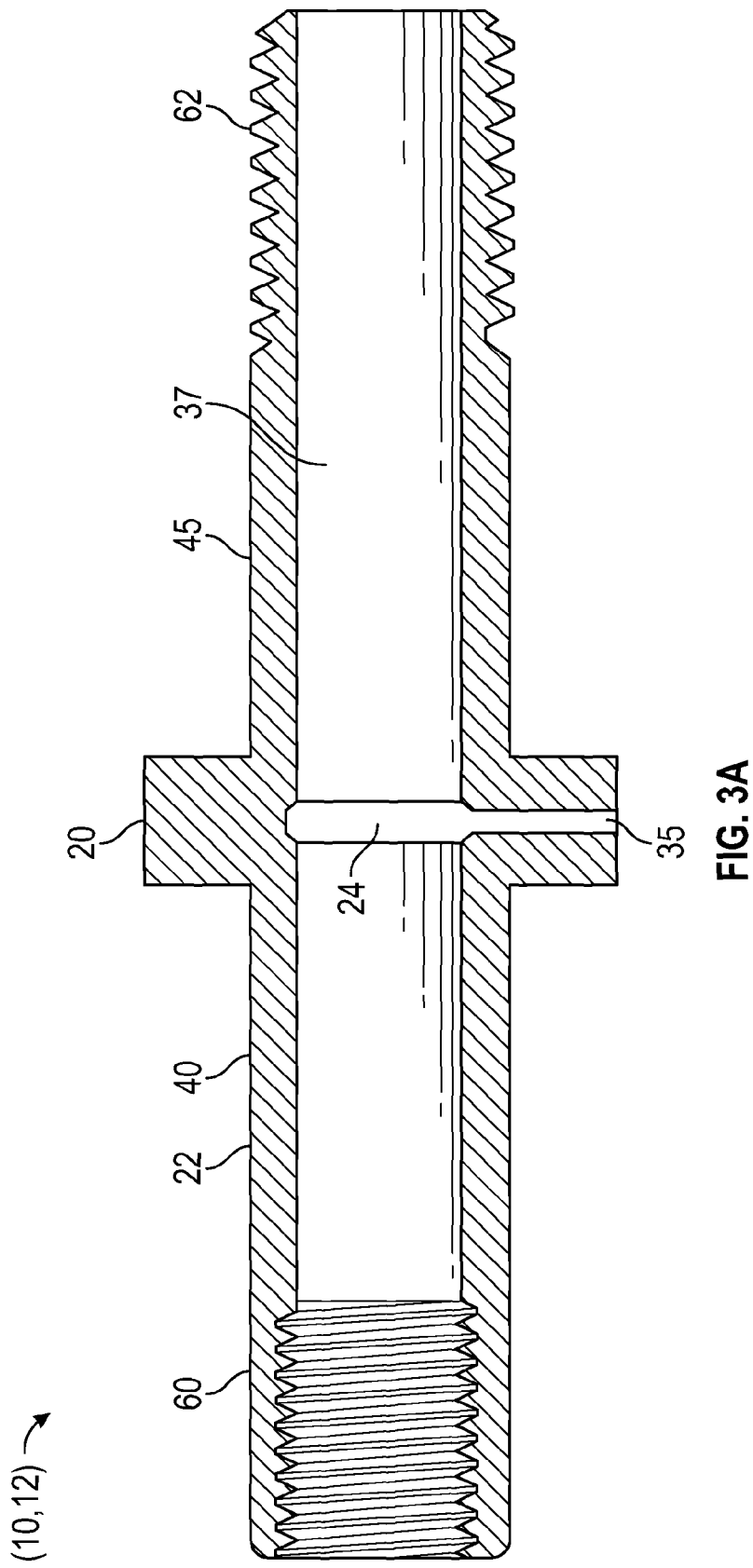
FIG. 3A is a side sectional view of the fitting of FIG. 3 in an embodiment having opposite ends with internally and externally threaded coupling sections.

Referring to FIGS. 2, 2A and 3, the drain coupling (10) or nipple (12) further comprise a unitary tool engaging member (20) which is generally centrally disposed as an enlarged section encircling tubular member (22) and protruding radially outward therefrom. Tool engaging member (20) further comprises a solid three-dimensional surface structure configured to cooperatively engage with a corresponding tool device. In the preferred embodiment, as shown tool engaging member (20) has a hexagonal profile and is configured to cooperatively engage with a wrench having a complementary profile. However, tool engaging member (20) can be configured to support other torque tools that can be used to interconnect electrical raceways.

In the preferred embodiment, the hexagonal tool engaging member (20) can be at least ⅞ inch in depth from an outer diameter of the tubular member (22) and at least 1⅛ inch wide in axial length. However, the depth can be configured in length to support drain passage (25, 25A, 35) as shown in FIGS. 2, 2A, and 3.

Figure 4:
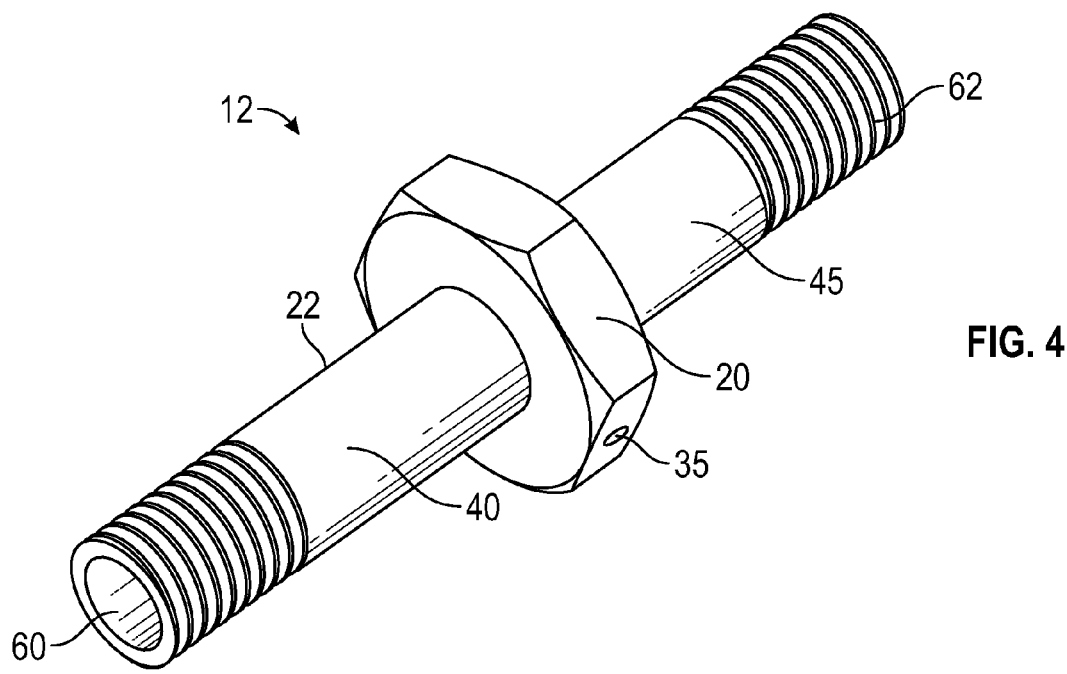
FIG. 4 is an isometric view of an embodiment of the fitting with external threads on the tubular member and with the drain passage of FIG. 3.
Figure 4A:
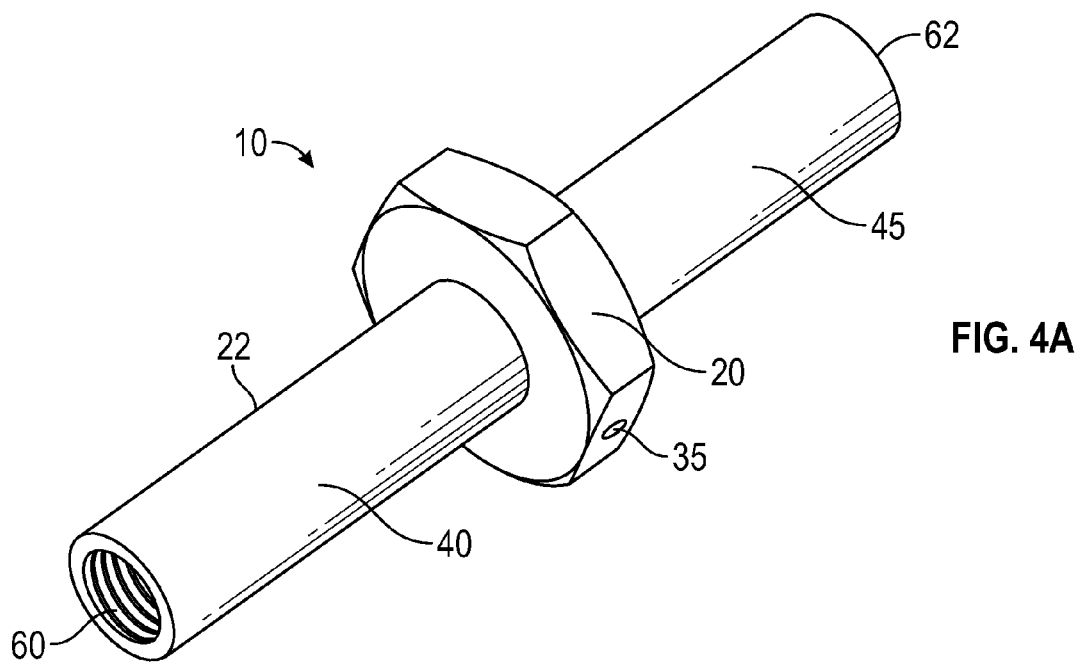
FIG. 4A is an isometric view of an embodiment of the fitting with internal threads on the tubular member and with the drain passage of FIG. 3.

First tubular portion (40) and opposing tubular portion (45) extend from opposing sides of tool engaging member (20) to respective distal ends as seen in FIGS. 4 and 4A. Drain coupling (10) or nipple (12) further comprise a first connection member (60) formed upon first tubular portion (40) and an opposing second connection member (62) formed upon opposing tubular portion (45). Each tubular portion is configured to cooperatively engage with raceways or raceway fittings within an electrical system (55) as depicted in FIGS. 1 and 1A. First connection member (60) and opposing second connection member (62) are shown as threaded and the threads can be internally or externally disposed, preferably female or male NPT or metric threads. In the preferred embodiment connection members (60, 62) can have a threaded length configured to accommodate the electrical raceway section or fitting of the system.

Referring to FIGS. 2, 2A, and 3, drain coupling (10) or nipple (12) further comprise a drain passage (25, 25A, 35) disposed within one section of the tool engaging member (20), perpendicularly aligned with throughbore (37), and having a continuous diameter linearly extending therefrom.

In one embodiment as shown in FIG. 3, drain passage (35) can be a smooth bore extending downward. In this embodiment drain passage (35) has a diameter that can be at least 1/16 inch. In the alternative embodiment in FIG. 2A, drain passage (25A) has threads (48). In this embodiment, the drain passage 25A is slightly larger at the external end and can have a diameter at least ½ inch to allow for connection to a threaded screen insert (13), which allows for drainage of condensation from the electrical raceway. As depicted, drain passage (25A) is perpendicularly aligned with throughbore (37) and extends linearly downward therefrom.

In the preferred embodiment, the connection members (60, 62) have conventional NPT or metric threading as depicted in FIGS. 3A, 4, 4A, 5, and 5A. However, connection members (60, 62) can be configured to support any electrical raceways or raceway fittings. Drain passage (25, 25A, 35) can have a small diameter of 1/16 inch and/or a larger diameter of ½ inch as depicted in FIGS. 2, 2A and 3.

Figure 5:
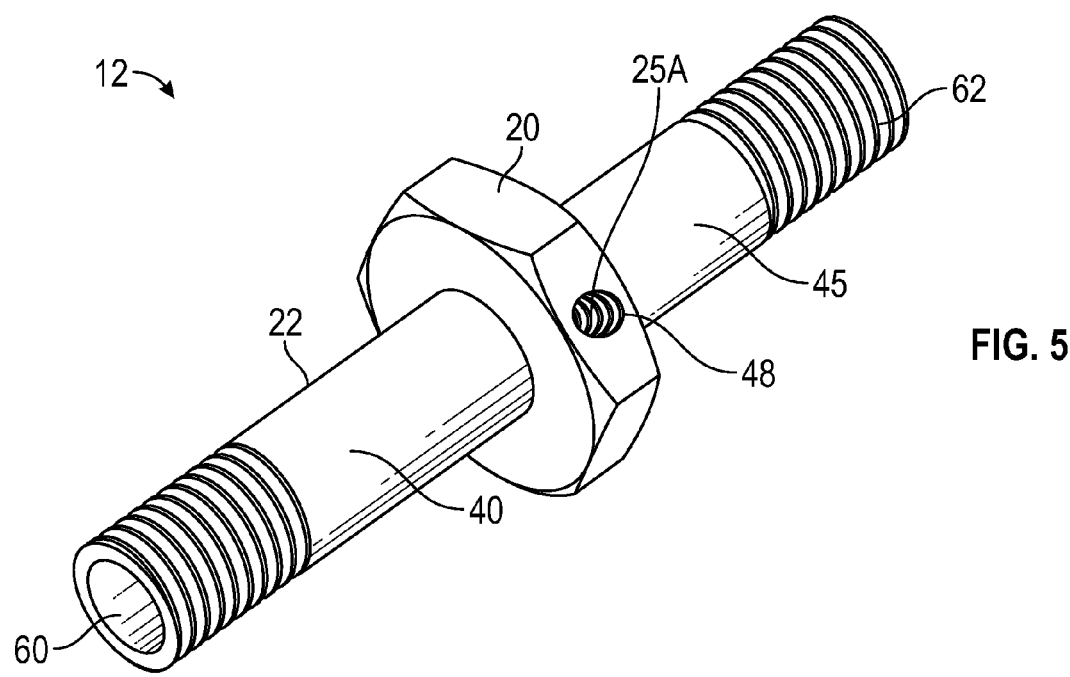
FIG. 5 is an isometric view of an embodiment of the fitting with external threads on the tubular member and with the drain passage of FIG. 2A.
Figure 5A:
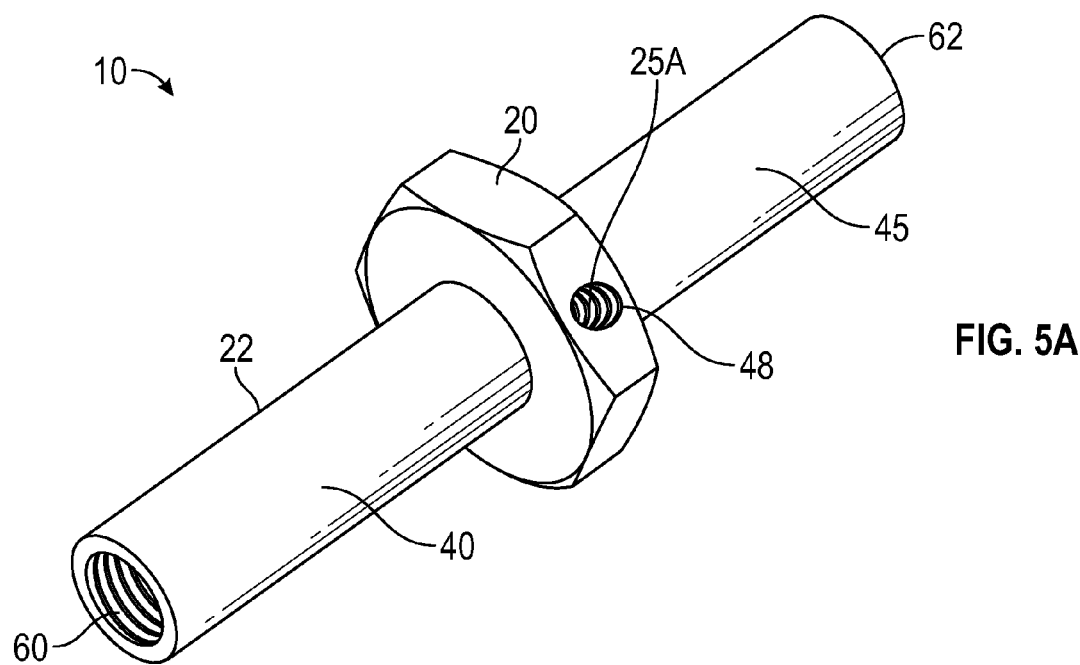
FIG. 5A is an isometric view of an embodiment of the fitting with internal threads on the tubular member and with the drain passage of FIG. 2A.

As shown in isometric view in FIGS. 4 and 4A, drain passage (35) is a smooth bore and extends through tool engaging member (20) and into the throughbore (37) of tubular member (20) at the cavity or groove (24). As shown in FIGS. 5 and 5A, drain passage (25A) linearly extends from the throughbore (37) (see FIG. 2A) and has a larger-diameter threaded section (48) to facilitate drainage by cooperatively engaging with screen insert (13) or another fitting (see FIGS. 2A, 7A, 8A). Threads (48) can be conventional NPT threading.

Figure 7:
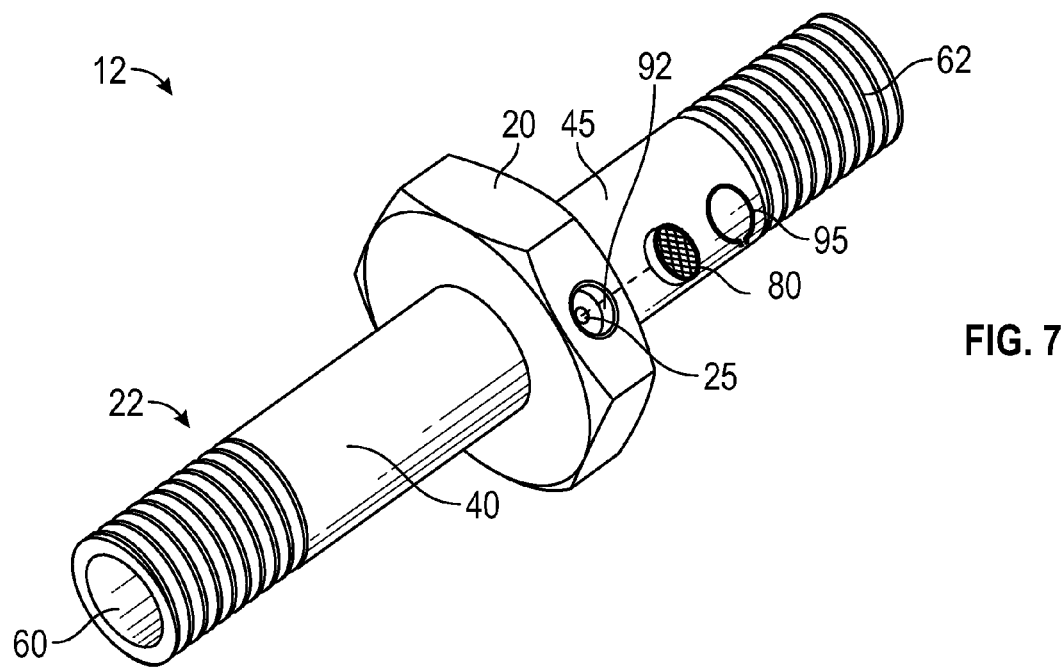
FIG. 7 is an isometric, partially exploded view of an embodiment of the fitting with external threads on the tubular member and with the screen insert of FIG. 2.
Figure 7A:
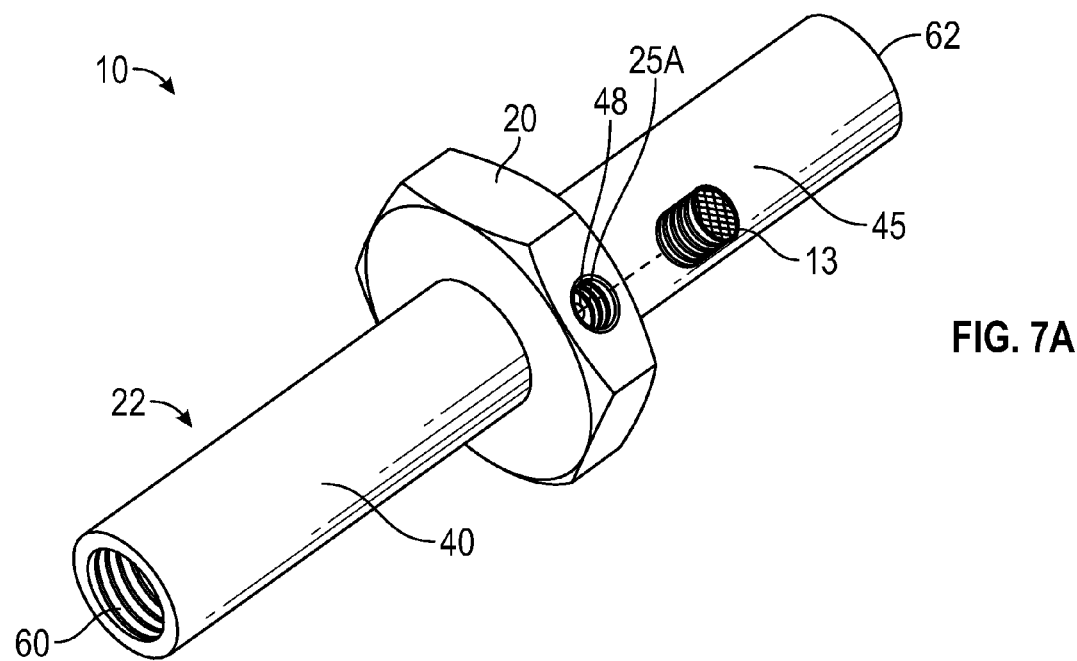
FIG. 7A is an isometric, partially exploded view of an embodiment of the fitting with internal threads on the tubular member and with the screen insert of FIG. 2A.

Referring to FIGS. 7 and 8, there is shown a screen insert (80) located at the end of the drain passage (25). Screen (80) can be made of plastic, stainless steel, aluminum, or another non-corrosive material. The outer end of the drain passage (35) is enlarged and has a radial channel (92) that receives the screen insert (80) therein. As seen in FIG. 7, a fastener such as a spring-loaded clip mechanism (95) can be disposed within channel (92) to allow the screen insert (80) to be securely fastened therein. Referring to FIGS. 7A and 8A, there is shown screen insert (13) which is installed within drain passage (25A) in enlarged threaded section (48).

While in use, drain coupling (10) or nipple (12) is placed within the lowest gravity point within the electrical raceway with the drain passage (25, 25A, 35) located facing downward which allows condensate or oil to drain down and out through drain passage (25, 25A, 35).

While the preferred embodiments of the invention have been shown and described, modifications thereof can be made by one skilled in the art without departing from the spirit and teachings of the invention. The embodiments described herein are exemplary only and are not limiting. Many variations and modification of the invention and apparatus disclosed herein are possible and are within the scope of the invention. Accordingly, the scope of protection is not limited by the description set out above, but is only limited by the claims which follow, the scope including all equivalents of the subject matter of the claims.

What is claimed is:

1. An electrical raceway drain fitting comprising
    a tubular member with a circular through bore forming an electrical raceway passage therethrough;
    first and second connection members at opposite first and second ends of the tubular member;
    a tool engaging member comprising an enlarged section of the tubular member located between and spaced from the first and second ends, wherein the tubular member has an outside diameter between the tool engaging member and the first and second ends that is less than an outer profile of the enlarged section, wherein the outer profile is configured for cooperative engagement by a torque tool, and wherein the through bore is formed between the first and second connection members through the enlarged section;
    a drain passage formed through a side of the enlarged section opening to the through bore for fluid communication between the through bore and an opening at an outer surface of the enlarged section; and
    a radial groove formed on an inside surface of the through bore at the opening to the drain passage.

2. The drain fitting of claim 1 wherein the connection members comprise threading.

3. The drain fitting of claim 2 wherein the first and second connection members are externally threaded.

4. The drain fitting of claim 2 wherein the first and second connection members are internally threaded.

5. The drain fitting of claim 2 wherein one of the first and second connection members is externally threaded and the other one is internally threaded.

6. The drain fitting of claim 1 further comprising a screen insert received in the drain passage.

7. The drain fitting of claim 6 wherein the screen insert is threadedly received in the drain passage.

8. The drain fitting of claim 6, wherein the screen insert is retained in a channel in the drain passage.

9. The drain fitting of claim 8, further comprising a spring-loaded mechanism to retain the screen insert.

10. The drain fitting of claim 1 wherein the drain passage has a longitudinal axis transverse to a longitudinal axis of the through bore.

11. An electrical raceway system, comprising:
    a drain fitting comprising first and second connection members at opposite first and second ends of a horizontally oriented tubular member operatively connected to respective first and second electrical raceway sections;
    a tool engaging member comprising an enlarged section of the tubular member located between and spaced from the first and second ends, wherein the tubular member has an outside diameter between the tool engaging member and the first and second ends that is less than an outer profile of the enlarged section, and wherein the outer profile is configured for cooperative engagement by a torque tool;
    a circular through bore between the first and second connection members through the tool engaging member of the tubular member;
    electrically conductive wires passing horizontally through the through bore of the tubular member from the first section of the connected electrical raceway to the second section of the connected electrical raceway;
    a drain passage formed through a side of the enlarged section and opening to the through bore for fluid communication between the through bore and an opening at an outer surface of the tool engaging member, wherein the tubular member is installed horizontally and the drain passage is in a vertical orientation below the through bore.

12. The electrical raceway system of claim 11 wherein the connection members comprise internal or external threading.

13. The electrical raceway system of claim 11 further comprising a radial groove formed on an inside surface of the through bore at the opening to the drain passage.

14. The electrical raceway system of claim 11 further comprising a screen insert received in the drain passage.

15. The electrical raceway system of claim 11 wherein the first and second connected electrical raceway sections comprise fittings connected to the respective first and second connection members.

16. The electrical raceway system of claim 11 wherein the first and second connected electrical raceway sections comprise conduit connected to the respective first and second connection members.

17. The electrical raceway system of claim 11 wherein the first connected electrical raceway section comprises conduit connected to the first connection member, and the second electrical raceway section comprises a fitting connected to the second connection member.

18. A method to drain an electrical raceway system, comprising:
    horizontally installing a tubular member of a drain fitting comprising first and second connection members at opposite first and second ends, wherein the tubular member comprises a circular through bore between the first and second connection members through a tool engaging member, wherein the tool engaging member comprises an enlarged section of the tubular member located between and spaced from the first and second ends, wherein the tubular member has an outside diameter between the enlarged section and the first and second ends that is less than an outer profile of the enlarged section;
    vertically orienting a drain passage formed through a side of the enlarged section and opening to the through bore for fluid communication between the through bore and an opening at an outer surface of the tool engaging member;
    cooperatively engaging a torque tool and the outer profile;
    operatively connecting the first and second connection members to respective first and second electrical raceway sections;
    passing electrically conductive wires horizontally through the through bore of the tubular member from the first section of the connected electrical raceway to the second section of the connected electrical raceway;
    draining condensate from the system through the drain passage.

19. The method of claim 18 further comprising threading a screen insert in the drain passage.

20. The method of claim 18 further comprising retaining a screen insert in the drain passage with a spring-loaded mechanism.

21. The method of claim 18, wherein the drain passage is formed with a longitudinal axis transverse to a longitudinal axis of the through bore.

* * * * *